United States Patent Office 3,193,679
Patented July 6, 1965

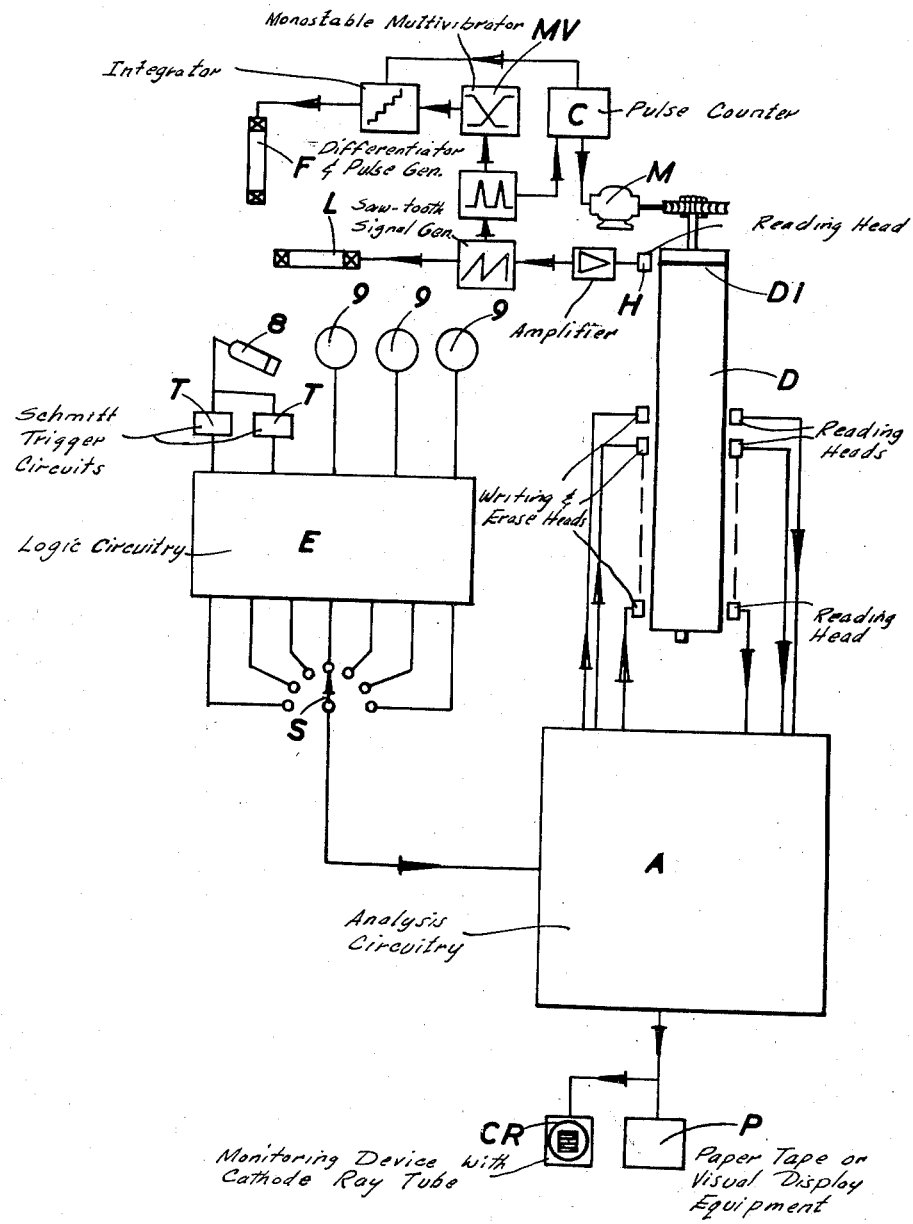

3,193,679
ELECTRON PROBE APPARATUS FOR COUNTING THE NUMBER OF INCLUSIONS IN A SPECIMEN
David Austin Melford and Keith Richard Whittington, Cambridge, England, assignors to T.I. (Group Services) Limited, Birmingham, England, a British company
Filed Apr. 24, 1963, Ser. No. 275,287
Claims priority, application Great Britain, Apr. 24, 1962, 15,481/62
3 Claims. (Cl. 250—49.5)

This invention relates to a method of and apparatus for counting and identifying inclusions, as, for example, in specimens of steel. Such specimens may contain inclusions of various shapes and sizes and of various compositions, although generally the inclusions can be expected to be of only a certain limited range of different elements and compounds.

Hitherto the identification of the elements present in the inclusions in steel specimens has been achieved by the use of X-ray spectrometers. It has been proposed to use these in conjunction with a scanned electron beam to form a scanning X-ray micro-analyser, and to display the information on the screen of a cathode ray tube in the form of a raster synchronised with the scanning signals, the intensity of the spot on the screen being controlled by the scintillation counter or a spectrometer to show the location of the inclusions, either of all inclusions or of those containing a particular element. However this gives no reading of the total number of inclusions, nor of their shape or size.

Up to the present the normal way of gauging the number of inclusions has been by a simple visual inspection of the specimen, and comparison of its appearance with that of a standard chart. Not surprisingly, this leads to different observers producing different results. Proposals have also been made for mechanising this counting process by means of a flying spot of light and photo-electric cells, but this process cannot distinguish between genuine inclusions and optional flaws or specks of dust, and is anyway severely limited in its applications.

It is an aim of the invention to overcome these drawbacks of the known arrangements. According to the invention it is now proposed to provide with one and the same beam of electrons the information necessary for identifying the element present in inclusions in the surface of a specimen, for example of steel, and also the information necessary for counting the number of inclusions present, either the total number or the number containing a selected element or compound. According to a further feature of the invention not only the number but also the size, and if necessary the shape, of the inclusions can be determined. The general principle of the invention is to scan the selected area of the specimen with an electron beam and to correlate the information from a scintillation counter or other device that measures the back-scatter of electrons with information from means generating the scanning signal in order to provide pulses in an electrical circuit as the beam passes over inclusions and then to analyse these pulses to give the number, size, and/or shape of the inclusions. The information about the composition of the inclusions can be obtained from a number of X-ray spectrometers receiving X-rays from the inclusions as the beam passes over them, there being one spectrometer for each of the elements likely to be encountered and each spectrometer is adjusted to the characteristic wavelength of one of the elements. This information from the spectrometers is correlated with that from the scanning signal and that from the back-scatter indicating device to allow one to derive information on the number, shape and size of inclusions of a particular composition.

According to a further feature of the invention, instead of having X-ray spectrometers to identify the elements of the inclusions, it would be possible to identify them, at least partially, by means of the back-scatter indicating device, making use of the fact that different elements or radicals produce different degrees of reduction in the intensity of the back-scatter signal. By pulse-height measurement on the electrical output of the device measuring the electron back-scatter it is thus possible to classify the elements or radicals present, provided only a limited number of possible elements are assumed to be present and provided one does not expect too fine a degree of discrimination.

The apparatus necessary for carrying out the method can be made by modifying an existing form of X-ray micro-analyser, or the apparatus could be designed from scratch for the combined counting and analysing function. In addition to the beam-forming and scanning equipment and the scintillation counter and X-ray spectrometers, the bulk of the remaining equipment comprises electrical and electronic logical circuits for evaluating the signals to produce the required information. This information can be displayed in visual or digital form or printed out.

The invention will now be further described by way of example with reference to the accompanying drawings, in which:

FIGURE 2 is a block circuit diagram indicating how the required information is stored and evaluated.

Figure 1:
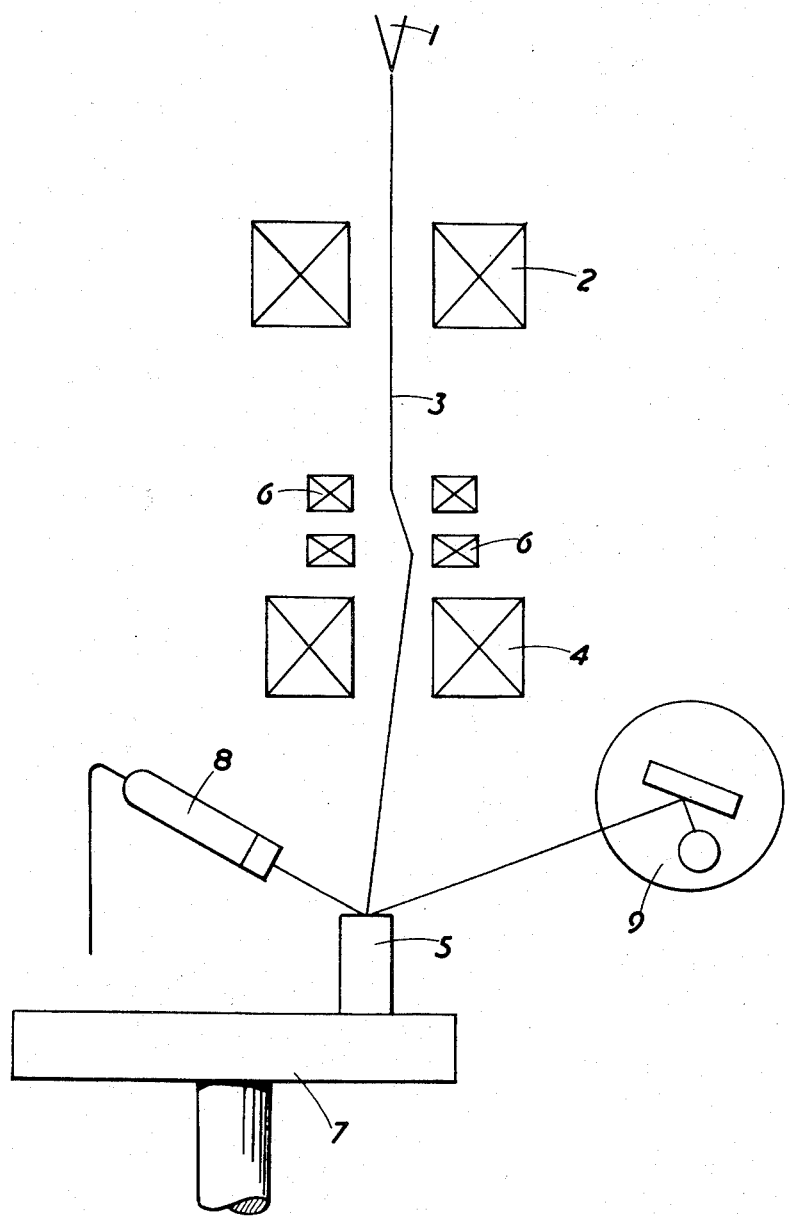
FIGURE 1 is a diagrammatic vertical section through the axis of an X-ray micro-analyzer incorporating a preferred form of equipment for carrying out the method according to the invention.

Referring first to FIGURE 1, an X-ray scanning micro-analyser comprises an electron gun 1 which, with the aid of an electro-magnetic condenser lens 2, produces a beam 3 of electrons. This beam is focussed by an objective lens 4 onto the flat surface of a specimen 5 of steel. Scanning coils 6 are fed with appropriate electrical signals to cause the beam to scan over a region of the surface of the specimen. The specimens and a member of other similar ones are arranged around a table 7 which can be indexed round to bring each specimen in turn under the beam 3.

In the example under consideration the electrons have an energy of the order of 30 kev. and the beam current is rather higher than in an instrument used solely for micro-analysis, for example one microampere instead of one tenth of a micro-ampere. The beam is focussed into a spot which is five microns (one micron is a thousandth part of a millimeter) in diameter. The spot is caused to scan over an area which is half a millimeter square, and the scanning is performed in 300 lines at a rate of ten lines per second, so that it takes thirty seconds to scan the area.

A scintillation counter 8, which may be in the form of a phosphor illuminated by impingement of the electrons and acting on a photo-multiplier cell, produces an electrical signal in response to the back-scatter of electrons reflected from the surface of the specimen. This signal is substantially constant as the beam travels over the steel surface of the specimen, but when the beam passes over an inclusion the signal decreases, and the extent of the decrease is dependent on the material of the inclusion.

In addition to the scintillation counter 8 there are a number of X-ray spectrometers arranged around the specimen, one of them being visible at 9. These detect the X-rays of different wavelengths emanating from the surface of the specimen under the action of the electron bombardment, and each is adjusted to receive X-rays of a different wavelength. The spectrometers can be of the crystal type and each produces an electrical pulse as the beam passes over an inclusion containing an element of which the characteristic wavelength is that to which that particular spectrometer is adjusted.

Before explaining the circuit further we will discuss briefly the problem involved in analysing the inclusions in steel. Firstly, certain fundamental assumptions are made, namely, that the great majority of the inclusions will be of ferrous sulphide, manganese oxide, manganese silicate, silica and alumina. By using five spectrometers adjusted to the five characteristic wavelengths, we can determine the presence of the five elements, sulphur, chromium, manganese, silicon and aluminium. The spectrometers may be of the fixed crystal type. The outputs of the five spectrometers can be correlated to ascertain which of the various possible compounds are present in the inclusions. For example, if only sulphur is indicated, the inclusion is assumed to be of ferrous sulphide, but if sulphur is present simultaneously with chromium or manganese then it is assumed that the inclusion is of chromium sulphide or manganese sulphide. Manganese alone is assumed to be present as manganese oxide and the simultaneous presence of manganese and silicon indicates manganese silicate. Silicon alone is assumed to be present as silica, and aluminium alone is assumed to be present as alumina.

If a pulse is received from the scintillation counter alone, without a simultaneous signal from any of the five spectrometers then the inclusion is assumed to be of ferrous oxide, or alternatively there is a hole present, not an inclusion.

Where the apparatus is being designed from scratch for carrying out the method according to the invention there is no difficulty in incorporating as many as five spectrometers, but where we modify an existing X-ray scanning micro-analyser it may be difficult to do so, and therefore in that case, we prefer to use fewer spectrometers, for example three, and to utilise the different degrees by which the signal in the scintillation counter is reduced by the different compositions of inclusion. Thus there is only a small decrease in the back-scatter intensity when sulphides are bombarded, but a greater decrease occurs with silicates. With the three spectrometers set to discriminate between manganese, chromium and aluminium it is thus still possible to determine which of the compounds listed earlier is present.

A circuit suitable for controlling the operation of the analyser and for evaluating the information is shown in outline in FIGURE 2. It is based on a magnetic drum store D which is arranged to rotate in synchronism with the line scanning signal of the scanning coils. In fact this drum forms the means by which the scanning signals are generated. The drum is rotated at a constant speed of ten revolutions per second by an electric motor M and carries a number of parallel recording tracks provided with writing, reading and erasing heads. A track D1 carries a pre-recorded sine wave signal that is picked up by a head H, amplified and used to generate a sawtooth signal to control the line scanning coils L of the micro-analyser. The saw tooth signal is also differentiated to produce a pulse at the end of each revolutions of the drum, i.e. at the end of each line, and these pulses actuate a monostable multivibrator circuit MV of which the output is integrated to form a signal increasing stepwise to feed the frame scanning coils F. These pulses are also counted in a counter C and after 300 pulses the step-wise signal is returned to zero and at the same time the drum-driving motor M is switched off whilst in addition an electric motor (not shown) controlling the table 7 is started up to index the table round and bring another specimen under the path of the electron beam. The completion of this indexing movement switches off the indexing motor and reconnects the motor M to rotate the drum D again and initiate a new scanning sequence.

During each scanning sequence the outputs of the scintillation counter 8 and the three spectrometers 9 are fed to various logical circuits to evaluate the information contained in them. The details of these circuits will not be explained as it is believed that they will be readily understood by those skilled in the art, but basically the principle is that the pulses produced in one or more of these devices as the scanning electron beam passes over an inclusion in the steel are compared and analysed to produce the desired information, making use of the remaining tracks on the drum D which stores these pulses where necessary and at the same time correlates the timing of the pulses with the line scan.

The pulses from the scintillation counter 8 are fed to a pair of pulse height discriminators in the form of Schmitt trigger circuits T set respectively to different levels to provide the necessary discrimination between sulphides and silicates. The outputs of these two trigger circuits are fed, together with the outputs of the three spectrometers 9 to logical circuit system indicated generally at E. The spectrometer output pulses are also fed through Schmitt trigger circuits (not shown) to improve their shape. This circuit system E includes coincidence circuits to ascertain in the manner described earlier which of the possible forms of inclusion are present, and it has seven output channels representing the seven possibilities. The seven outputs are in the form of pulses, each pulse occurring when the electron beam passes over an inclusion of the kind associated with that output channel. The length of each pulse is dependent on the width of the inclusion in the direction of the scanning lines.

A multi-pole selector switch shown diagrammatically as S allows any one of these outputs to be selected for further analysis in a circuit A. We will not describe this circuit in detail but will outline what it can do, by suitable analysis and correlation of the pulses.

The circuit can; (1) count the number of inclusions present in the scanned area, irrespective of their compositions; (2) count the number of inclusions of greater than a certain size; (3) count the number of inclusions in each of a number of size ranges; (4) count the number of inclusions (of any size, of greater than a certain size, or in each of a number of size ranges) of a selected composition; (5) obtain an indication of the average size of the inclusions of a given type or of any type; (6) determine at least roughly the shape of the inclusions by measuring their aspect ratio, i.e. the ratio between their width in the direction of the scanning lines to their length in a direction transverse to the scanning lines.

Instead of counting the actual number of inclusions of a particular type or size, the circuit can simply indicate the total quantity of such inclusion present, as a percentage of the total area scanned.

The discrimination between inclusions of different sizes is achieved by passing the signal from the switch S through a number, for example five, of pulse length discriminators set to different pulse lengths, each set to give an output only if the input pulse is greater than the pre-set length.

Usually many of the inclusions present will be of such a size that each is swept over by the electron beam in several successive scanning lines. Where only the total amount of inclusion, expressed as a percentage of the area scanned, is to be determined than this does not matter, and the circuit A simply has to add up the total length of pulses, irrespective of whether they come from many small inclusions or a few large ones. But where information is required on the actual number of inclusions this difficulty must be overcome. This is done by comparing the pulses in two successive scanning lines and if a pulse occurring at a given point in one scanning line is matched by a similar pulse at the same point in the next line, one of these is ignored for counting purposes. On the other hand where the area or shape of each inclusion needs to be known the number of lines in which the same pulse occurs is counted.

The comparison of pulses in successive lines is done by storing the signal from each line on a track on the drum D, storing that from the next line on an adjacent track, and then comparing, during the subsequent rotation of the drum, the information stored on the two tracks. This process is carried on continuously, the information being erased from each track after the comparison, so that the track can be used for comparing a subsequent pair of lines.

The apparatus for counting the inclusions makes use of the remaining tracks on the drum D. Each track is used for recording the presence of a signal indicating an inclusion of a particular constitution and size. Signals at the writing head of any one track are compared continuously with signals from the reading head of the same track, and the speed of rotation of the drum is such that the time interval between a signal being recorded on the drum and the same signal being picked up by the reading head is equal to the duration of one line scan.

Instead of a magnetic drum, other means could be used for temporarily storing the information during each line scan, for example an electro-mechanical or electronic delay line, or an endless loop of magnetic tape.

In the preferred form of the circuit A the signals indicating the presence of inclusions of particular types and sizes are fed into twelve binary stores, each of which will count the total number of inclusions of this type or size detected in the area scanned. The numbers stored in these stores at the end of the scanning operation can be read out sequentially by means of a multi-way switch so that they can be viewed on an illuminated display or printed out on paper tape.

To determine simply the overall percentage of the scanned area represented by inclusions of a particular type or size we make use of the sine wave signal stored on the track D1. When a signal is received in the circuit A indicating the presence of an inclusion of the selected type or size, an electronic gate is opened, feeding this sine wave signal to a binary store. The gate is closed when the beam moves clear of the inclusion, and thus the total number registered by the binary store at the end of the scanning operation is representative of the total area of inclusions of the selected size or type.

To give the length of the inclusions in a direction perpendicular to the scanning lines the number of successive lines in which a pulse occurs at a given point is counted and used to produce a single pulse of which the length is proportional to the number of such lines, or it could produce a train of pulses, one for each such line, or a third possibility is a single pulse of which the amplitude is proportional to the number of such lines.

As well as the paper tape or visual display equipment, indicated generally at P, there may also be a monitoring device in the form of a cathode ray tube screen CR carrying a raster representing the area scanned, and with the brightness of the spot controlled selectively by any of the signals in the circuit A, so that it will display at will the distribution of inclusions of any selected type or size.

Instead of being displayed visually or on paper tape, the information produced by the circuit A could be shown in any suitable manner, such as on magnetic tape, punched cards, or on punched tape for analysis in further machines. It may be printed out, or displayed as histograms on cathode ray tube screens.

As machine for printing out the information at the requisite speed are relatively costly, printing out would preferably be effected on a slower, less expensive machine from a recording of the information played back at a speed slower than the recording speed.

The information obtained in scanning one field on a specimen may be analysed and presented separately, but if desired the information obtained in scanning successively two or more different fields on the specimen may be added together for joint analysis and presentation.

We claim:

1. Apparatus for counting the number of inclusions in the surface of a specimen of material, said apparatus comprising: electron-beam-forming means; means for causing said beam to scan an area of the surface of the specimen by causing the beam to pass successively over adjacent lines of the area; means for detecting the back-scatter of electrons from said surface as the beam scans the surface; means for deriving a signal which varies in accordance with the changes in the intensity of the detected back-scatter; means for recording said signal; means for comparing that part of said signal resulting from each scanned line with that part of the recorded signal resulting from the previously scanned line; means for producing a response when significant differences in the two said parts of the signal occur; and means for counting half the number of such responses, the number counted thus being equal to the number of inclusions.

2. Apparatus for counting the number of inclusions in the surface of a specimen of material, said apparatus comprising: electron-beam-forming means; means for causing said beam to scan an area of the surface of the specimen by causing the beam to pass successively over adjacent lines of the area; means for detecting the X-rays emanating from said surface as the beam scans the surface; means for deriving a signal which varies in accordance with the changes in the wavelength of the X-rays; means for recording said signal; means for comparing that part of said signal resulting from each scanned line with that part of the recorded signal resulting from the previously scanned line; means for producing a response when significant differences in the two said parts of the signal occur; and means for counting half the number of such responses, the number counted thus being equal to the number of inclusions.

3. Apparatus for counting the numbers of inclusions of two chemically different types in the surface of a specimen of material, the first type of inclusion containing a first chemical element and the second type of inclusion containing the first chemical element and a second chemical element, this second chemical element not being present in the first type of inclusion, said apparatus comprising: electron-beam-forming means; means for causing said beam to pass successively over adjacent lines of the area; means for detecting the X-rays emanating from said surface as the beam scans the surface; means for deriving a first signal indicative of the emanation of X-rays from the first chemical element; means for deriving a signal indicative of the emanation of X-rays from the second chemical element; means for distinguishing occasions of a first kind when the first signal is produced without the second signal from occasions of a second kind when the first and second signals are produced together; and means for counting the number of occasions of the first kind except any occasion of the first kind resulting from the beam scanning any part of a line following a previous occasion of the first kind resulting from the beam scanning the adjacent part of the previous line, said number being equal to the number of inclusions of the first type; and means for counting the number of occasions of the second kind except any occasion of the second kind resulting from the beam scanning any part of a line following a previous occasion of the second kind resulting from the beam scanning the adjacent part of the previous line, the last-mentioned number being equal to the number of inclusions of the second type.

References Cited by the Examiner

UNITED STATES PATENTS 3,103,584  9/63  Shapiro et al. _____ 250—49.5

RALPH G. NILSON, *Primary Examiner.*